(12) United States Patent
Kitazawa et al.

(10) Patent No.: US 12,479,186 B2
(45) Date of Patent: Nov. 25, 2025

(54) FIBER-REINFORCED SHEET LAMINATE, PRODUCTION METHOD FOR FIBER-REINFORCED SHEET LAMINATE, AND PRODUCTION METHOD FOR STRUCTURE

(71) Applicant: MITSUBISHI HEAVY INDUSTRIES, LTD., Tokyo (JP)

(72) Inventors: Toshiki Kitazawa, Tokyo (JP); Masahiko Shimizu, Tokyo (JP); Yoko Taguchi, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 256 days.

(21) Appl. No.: 18/015,610

(22) PCT Filed: Dec. 28, 2020

(86) PCT No.: PCT/JP2020/049202
§ 371 (c)(1),
(2) Date: Jan. 11, 2023

(87) PCT Pub. No.: WO2022/145005
PCT Pub. Date: Jul. 7, 2022

(65) Prior Publication Data
US 2023/0249432 A1 Aug. 10, 2023

(51) Int. Cl.
*B32B 3/24* (2006.01)
*B29C 70/20* (2006.01)
(Continued)

(52) U.S. Cl.
CPC ............ *B32B 3/266* (2013.01); *B29C 70/205* (2013.01); *B29C 70/207* (2013.01); *B29C 70/30* (2013.01);
(Continued)

(58) Field of Classification Search
None
See application file for complete search history.

(56) References Cited

U.S. PATENT DOCUMENTS 4,759,985 A * 7/1988 Armiger ................. C03C 25/26
428/408
4,990,207 A * 2/1991 Sakai .................... B29C 70/345
156/263
(Continued)

FOREIGN PATENT DOCUMENTS

DE 102013021124 A1 * 6/2015 ............. B29C 70/22
DE 202017105285 U1 * 11/2018 ......... B29C 37/0057
(Continued)

OTHER PUBLICATIONS

Machine Translation of JP2017144567A, Aug. 2017 (Year: 2017).*
(Continued)

*Primary Examiner* — Jeffrey A Vonch
(74) *Attorney, Agent, or Firm* — HAUPTMAN HAM, LLP

(57) ABSTRACT

A multi-stack material includes a plurality of fiber-reinforced sheets that are laminated. The fiber-reinforced sheets include a first fiber-reinforced sheet in which a first fiber extends in a first direction and a second fiber-reinforced sheet in which a second fiber extends in a second direction that is different from the first direction. The first fiber-reinforced sheet has formed therein a plurality of first slits where the first fiber is cut such that each cut-up segment of the first fiber will have an equal length. The second fiber-reinforced sheet has formed therein a plurality of second slits where the second fiber is cut such that each cut-up segment of the second fiber will have an equal length. The first slits and the second slits are arranged so as to overlap with each other when viewed from the direction of lamination.

4 Claims, 14 Drawing Sheets

(51) Int. Cl.

| | | |
|---|---|---|
| *B29C 70/30* | (2006.01) | |
| *B29C 70/54* | (2006.01) | |
| *B32B 3/26* | (2006.01) | |
| *B32B 5/02* | (2006.01) | |
| *B32B 5/12* | (2006.01) | |
| *B32B 5/26* | (2006.01) | |
| *B32B 5/28* | (2006.01) | |
| *B32B 38/04* | (2006.01) | |
| *B29K 105/08* | (2006.01) | |
| *B29L 7/00* | (2006.01) | |
| *B29L 31/00* | (2006.01) | |
| *B29L 31/30* | (2006.01) | |

(52) U.S. Cl.
CPC .............. *B29C 70/545* (2013.01); *B32B 5/02* (2013.01); *B32B 5/022* (2013.01); *B32B 5/12* (2013.01); *B32B 5/26* (2013.01); *B32B 5/265* (2021.05); *B32B 5/267* (2021.05); *B32B 5/28* (2013.01); *B32B 38/04* (2013.01); *B29C 70/202* (2013.01); *B29C 2793/0036* (2013.01); *B29C 2793/0081* (2013.01); *B29K 2105/0881* (2013.01); *B29K 2995/0045* (2013.01); *B29L 2007/002* (2013.01); *B29L 2031/003* (2013.01); *B29L 2031/3076* (2013.01); *B32B 2038/045* (2013.01); *B32B 2250/20* (2013.01); *B32B 2260/023* (2013.01); *B32B 2260/046* (2013.01); *B32B 2305/076* (2013.01); *B32B 2305/10* (2013.01); *B32B 2305/20* (2013.01); *B32B 2307/708* (2013.01); *B32B 2605/18* (2013.01); *Y10T 428/24124* (2015.01); *Y10T 428/24314* (2015.01); *Y10T 428/24322* (2015.01)

(56) References Cited

U.S. PATENT DOCUMENTS

| | | | | |
|---|---|---|---|---|
| 4,992,127 | A * | 2/1991 | Kishi | B29B 15/08 156/182 |
| 5,217,656 | A * | 6/1993 | Buckley | B29C 35/0266 264/495 |
| 2010/0028593 | A1* | 2/2010 | Taketa | B32B 5/26 428/113 |
| 2010/0092770 | A1* | 4/2010 | Wadahara | B29C 70/0035 156/278 |
| 2010/0227115 | A1* | 9/2010 | Esaki | B29D 99/0003 428/114 |
| 2010/0233423 | A1* | 9/2010 | Corden | B29C 70/465 428/113 |
| 2010/0233424 | A1* | 9/2010 | Dan-Jumbo | B64C 1/068 428/113 |
| 2010/0285265 | A1* | 11/2010 | Shinoda | B32B 5/022 428/80 |
| 2011/0140299 | A1* | 6/2011 | Huang | B26D 3/08 428/156 |
| 2016/0009054 | A1* | 1/2016 | Okunaka | C08J 5/042 428/113 |
| 2016/0016382 | A1* | 1/2016 | Ishikawa | B29B 15/08 156/324 |
| 2016/0194468 | A1* | 7/2016 | Ogasawara | B29B 15/08 524/495 |
| 2016/0297167 | A1* | 10/2016 | Crawford, III | B29B 15/08 |
| 2016/0297185 | A1* | 10/2016 | Nagasaka | C08J 5/243 |
| 2016/0332413 | A1* | 11/2016 | Kismarton | B32B 3/26 |
| 2017/0173826 | A1* | 6/2017 | Beck | B29C 51/264 |
| 2017/0283571 | A1* | 10/2017 | Taketa | B32B 27/281 |
| 2018/0222128 | A1* | 8/2018 | Tomioka | B29C 43/48 |
| 2018/0297320 | A1* | 10/2018 | Fujita | B29C 70/081 |
| 2019/0077048 | A1* | 3/2019 | Fujita | B29C 70/10 |
| 2019/0210301 | A1* | 7/2019 | Naito | B32B 27/38 |
| 2019/0232528 | A1* | 8/2019 | Tsuda | C08J 5/243 |
| 2020/0180260 | A1 | 6/2020 | Crawford, III | |
| 2021/0107236 | A1* | 4/2021 | Guha | B29C 70/12 |
| 2021/0122136 | A1* | 4/2021 | Adachi | B32B 5/08 |
| 2021/0229377 | A1* | 7/2021 | Shimada | B29C 70/205 |
| 2022/0315718 | A1* | 10/2022 | Naito | B29C 70/14 |
| 2022/0371293 | A1* | 11/2022 | Nakano | B32B 5/12 |
| 2023/0249432 | A1* | 8/2023 | Kitazawa | B32B 3/266 428/136 |
| 2023/0302767 | A1* | 9/2023 | Kitazawa | B32B 5/26 |

FOREIGN PATENT DOCUMENTS

| | | | | |
|---|---|---|---|---|
| JP | 60224530 | A * | 11/1985 | .............. B29B 15/08 |
| JP | 63247012 | A * | 10/1988 | |
| JP | 02115236 | A * | 4/1990 | |
| JP | H02-115236 | A | 4/1990 | |
| JP | 2007146151 | A * | 6/2007 | ........... B29C 70/205 |
| JP | 2007261141 | A * | 10/2007 | ............. B29B 15/08 |
| JP | 2008132775 | A * | 6/2008 | |
| JP | 2008207544 | A * | 9/2008 | ............. B29B 15/08 |
| JP | 2008207545 | A * | 9/2008 | ............. B29B 15/08 |
| JP | 2008208343 | A * | 9/2008 | ............. B29B 15/08 |
| JP | 2008260793 | A * | 10/2008 | ............. B29B 15/08 |
| JP | 2008-273176 | A | 11/2008 | |
| JP | 2008279753 | A * | 11/2008 | ............. B29B 15/08 |
| JP | 2009019201 | A * | 1/2009 | ........... D04B 21/165 |
| JP | 2009220480 | A * | 10/2009 | ............. B29B 15/08 |
| JP | 2009286817 | A * | 12/2009 | ............. B29B 15/08 |
| JP | 2010023449 | A * | 2/2010 | ............. B29B 15/08 |
| JP | 2010046956 | A * | 3/2010 | ............. B29B 15/08 |
| JP | 4779754 | B2 | 9/2011 | |
| JP | 5272418 | B2 | 8/2013 | |
| JP | 2014169411 | A * | 9/2014 | |
| JP | 2014189722 | A * | 10/2014 | ............. B29B 15/08 |
| JP | 2015030950 | A * | 2/2015 | |
| JP | 2015051629 | A * | 3/2015 | ........... B29C 70/205 |
| JP | 2015163660 | A * | 9/2015 | ............. B29B 15/08 |
| JP | 2016087907 | A * | 5/2016 | |
| JP | 2016108348 | A * | 6/2016 | ............. B29B 15/08 |
| JP | 2016-180037 | A | 10/2016 | |
| JP | 2017082210 | A * | 5/2017 | |
| JP | 2017144567 | A * | 8/2017 | |
| JP | 2017171894 | A * | 9/2017 | ........... B29C 70/205 |
| JP | 6597309 | B2 | 10/2019 | |
| WO | WO-2015152331 | A1 * | 10/2015 | ........... B29C 70/202 |
| WO | WO-2017046577 | A1 * | 3/2017 | ........... B29C 70/205 |
| WO | WO-2019031478 | A1 * | 2/2019 | ............. B29C 43/18 |
| WO | WO-2021180335 | A1 * | 9/2021 | ............. B29B 15/08 |

OTHER PUBLICATIONS

Machine Translation of JPS60224530A, Nov. 1985 (Year: 1985).*
PCT/ISA/210, "International Search Report for PCT International Application No. PCT/JP2020/049202," Mar. 9, 2021.

* cited by examiner

FIBER-REINFORCED SHEET LAMINATE, PRODUCTION METHOD FOR FIBER-REINFORCED SHEET LAMINATE, AND PRODUCTION METHOD FOR STRUCTURE

RELATED APPLICATIONS

The present application is National Phase of International Application No. PCT/JP2020/049202 filed Dec. 28, 2020, the disclosure of which is hereby incorporated by reference herein in its entirety.

TECHNICAL FIELD

The present disclosure relates to a fiber-reinforced sheet laminate, a production method for a fiber-reinforced sheet laminate, and a production method for a structure.

BACKGROUND ART

A composite material, for example, carbon fiber-reinforced plastic (CFRP) is sometimes used for an aircraft component such as an aircraft fuselage or a main wing. A structural member (a composite structure) made of CFRP, which configures an aircraft component, has any cross-sectional shape. As one of the methods for manufacturing such a composite structure, there is a method of manufacturing a flat or nearly flat laminate (also called a charge) by laminating a plurality of fiber-reinforced sheets, and performing bending on the laminate to provide any cross-sectional shape.

In a case of manufacturing a component having a cross-sectional shape change, twist, or curvature by such a method, bending is performed on the laminate so as to obtain a shape having curvature. At this time, in a curvature region of the laminate, a difference in peripheral length occurs between the inner side and the outer side. However, the fiber-reinforced sheet does not have stretchability in a direction in which the fibers extend (hereinafter referred to as a "fiber direction"). Therefore, when bending is performed, depending on the fiber direction of the fiber-reinforced sheet, a difference in peripheral length cannot be absorbed, so that there is a possibility that wrinkles may easily occur in the laminate. If wrinkles occur in the laminate, there is a possibility that strength may be reduced.

In order to solve such a problem, it is known to form slits that cut the fibers in a reinforcing fiber sheet (for example, PTL 1).

In PTL 1, the slits are formed in a direction orthogonal to the fiber direction or at a predetermined angle in prepreg preforms 2a to 2d composed of reinforcing fibers oriented in one direction and a matrix resin.

CITATION LIST

Patent Literature

[PTL 1] Japanese Patent No. 4779754

SUMMARY OF INVENTION

Technical Problem

When manufacturing a laminate, there is a case of simplifying the process of manufacturing the laminate by lamination of a fiber-reinforced sheet laminate in which a plurality of fiber-reinforced sheet are laminated in advance, instead of laminating fiber-reinforced sheets one by one. PTL 1 does not consider forming slits in such a fiber-reinforced sheet laminate.

In order to cut the fibers of a fiber-reinforced sheet laminate, as shown in FIG. 12, a method of forming continuous long slits 101 in a multi-stack material 100 is conceivable. However, for example, in a case where the fiber-reinforced sheet laminate is composed of dry fiber-reinforced sheets with no or weak interlayer adhesion, as shown in FIG. 12, there is a possibility that problems such as a fiber-reinforced sheet 100a curling up or the fiber-reinforced sheets 100a and 100b being separated from each other may easily occur.

Further, in order to suppress the occurrence of such problems, a method of intermittently forming slits in a fiber-reinforced sheet laminate, as shown in FIG. 13, is conceivable. However, for example, in a case where a fiber direction is different for each fiber-reinforced sheet to be laminated, even if slits are formed in the fiber-reinforced sheet laminate, there is a case where the fibers cannot be cut at equal intervals in any of the fiber-reinforced sheets. In that case, there is a case where in the fiber-reinforced sheet, a fiber length unintentionally becomes shorter or a decrease in strength occurs. Further, there is a case where in the fiber-reinforced sheet, the fiber length unintentionally becomes longer or the effect of improving shaping-ability by the formation of the slits is not obtained.

The present disclosure has been made in view of such circumstances, and has an object to provide a fiber-reinforced sheet laminate, a production method for a fiber-reinforced sheet laminate, and a production method for a structure, in which it is possible to suppress a decrease in the strength of the fiber-reinforced sheet laminate.

Further, an object of the present invention is to provide a fiber-reinforced sheet laminate, a production method for a fiber-reinforced sheet laminate, and a production method for a structure, in which it is possible to improve shaping-ability of the fiber-reinforced sheet laminate.

Solution to Problem

A fiber-reinforced sheet laminate according to an aspect of the present disclosure is a fiber-reinforced sheet laminate including a plurality of fiber-reinforced sheets that are laminated, in which the plurality of fiber-reinforced sheets include a first fiber-reinforced sheet in which first fibers extend in a first direction, and a second fiber-reinforced sheet in which second fibers extend in a second direction different from the first direction, the first fiber-reinforced sheet has a plurality of first slits that cut the first fibers such that the cut first fibers have the same length, the second fiber-reinforced sheet has a plurality of second slits that cut the second fibers such that the cut second fibers have the same length, and the first slit and the second slit are disposed to overlap each other when viewed from a lamination direction.

A production method for a fiber-reinforced sheet laminate according to an aspect of the present disclosure includes a lamination step of laminating a first fiber-reinforced sheet having first fibers extending in a first direction and a second fiber-reinforced sheet having second fibers extending in a second direction different from the first direction, and a slitting step of forming a plurality of slits in the laminated first fiber-reinforced sheet and second fiber-reinforced sheet to cut the first fibers and the second fibers, in which in the slitting step, the slits are formed to cut the first fibers such that the cut first fibers have the same length and cut the second fibers such that the cut second fibers have the same length.

Advantageous Effects of Invention

According to the present disclosure, it is possible to suppress a decrease in the strength of a fiber-reinforced sheet laminate. Further, it is possible to improve the shaping-ability of the fiber-reinforced sheet laminate.

DESCRIPTION OF EMBODIMENTS

Hereinafter, an embodiment of a fiber-reinforced sheet laminate, a production method for a fiber-reinforced sheet laminate, and a production method for a structure according to the present disclosure will be described with reference to the drawings.

First Embodiment

A first embodiment of the present disclosure will be described with reference to FIGS. 1 to 6. In the present embodiment, a charge 2 having a flat or nearly flat shape is manufactured by laminating a plurality of multi-stack materials (fiber-reinforced sheet laminates) 1, in each of which a plurality of fiber-reinforced sheets are laminated, and a composite structure (structure) 3 having a desired shape is manufactured by performing bending on the charge 2. The composite structure 3 is used, for example, for a stringer, a spar, a frame, a rib, or the like, which is an aircraft component configuring an aircraft structure.

Figure 1:
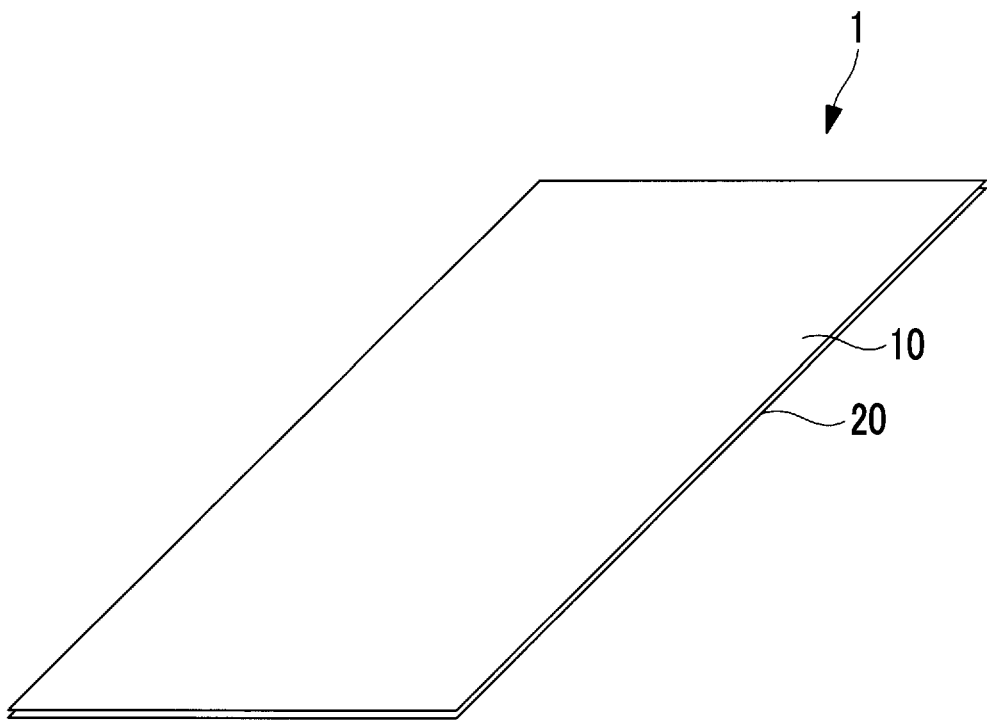
FIG. 1 is a perspective view of a multi-stack material according to an embodiment of the present disclosure.

The multi-stack material 1 according to the present embodiment includes a first fiber-reinforced sheet 10 and a second fiber-reinforced sheet 20 which are laminated, as shown in FIG. 1. The first fiber-reinforced sheet 10 and the second fiber-reinforced sheet 20 are dry fiber-reinforced sheets with no or weak interlayer adhesion. The first fiber-reinforced sheet 10 and the second fiber-reinforced sheet 20 are integrated by being sewn with thread formed of glass fiber or the like.

Figure 2:
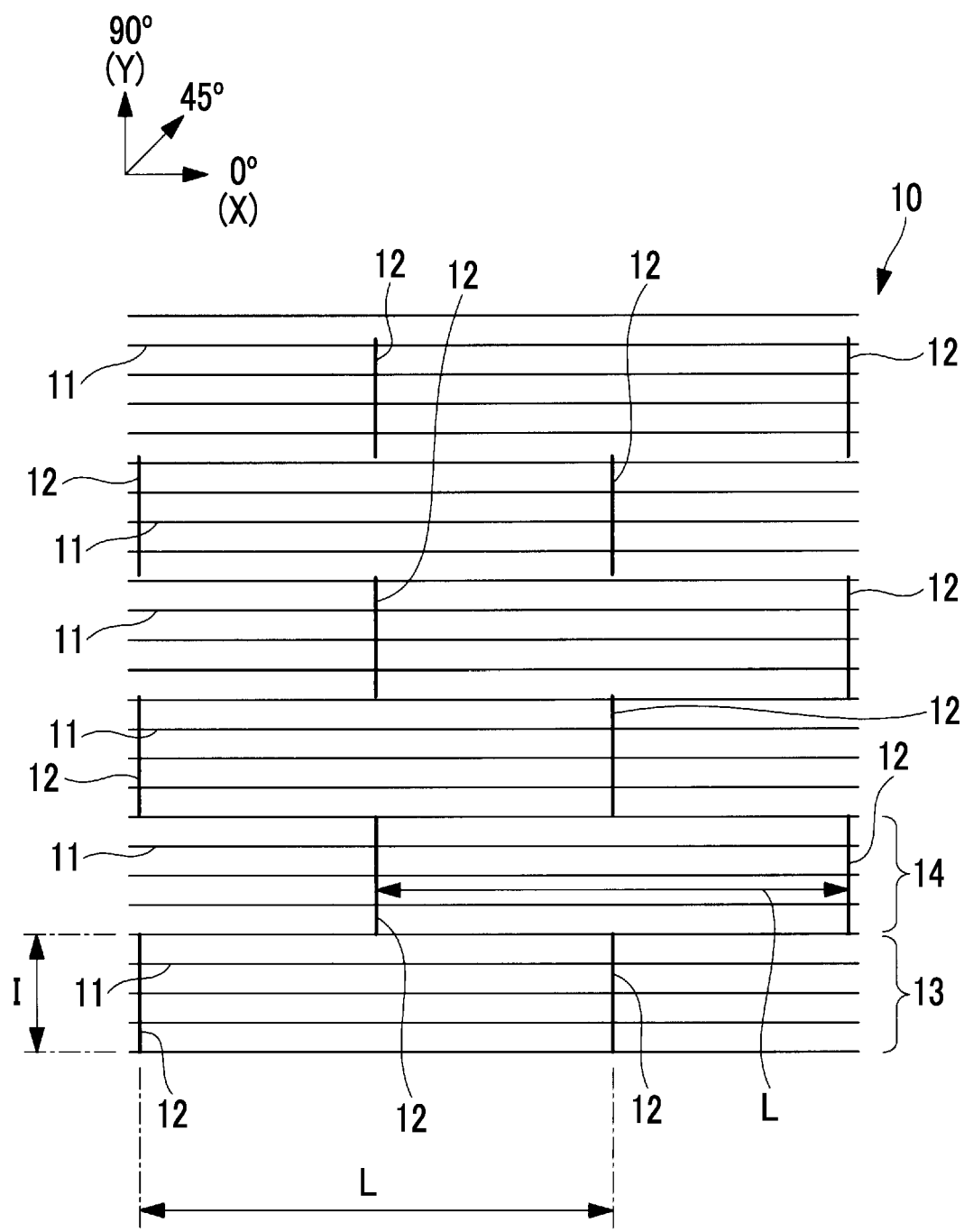
FIG. 2 is a schematic plan view of a first fiber-reinforced sheet that is included in the multi-stack material according to a first embodiment of the present disclosure.

The first fiber-reinforced sheet 10 has a plurality of first fibers 11 extending in a 0-degree direction (a first direction), as shown in FIG. 2. The 0-degree direction is a direction along the direction in which a compressive force acts (refer to an arrow A3 in FIG. 5) or the direction in which a tensile force acts (refer to an arrow A6 in FIG. 6), when bending is performed on the charge 2. The line extending in a right-left direction in FIG. 2 indicates the first fiber 11.

Further, as shown in FIG. 2, the first fiber-reinforced sheet 10 has a plurality of first slits 12 that cut the first fibers 11. Each of the first slits 12 extends in a 90-degree direction (a predetermined direction). The 90-degree direction is an angle based on the 0-degree direction, and is a direction forming an angle of 90 degrees with respect to the 0-degree direction.

The plurality of first slits 12 are disposed in a zigzag pattern. Further, the plurality of first slits 12 are disposed such that the cut first fibers 11 have the same length. Details of the shape and disposition of the first slit 12 will be described later.

Figure 3:
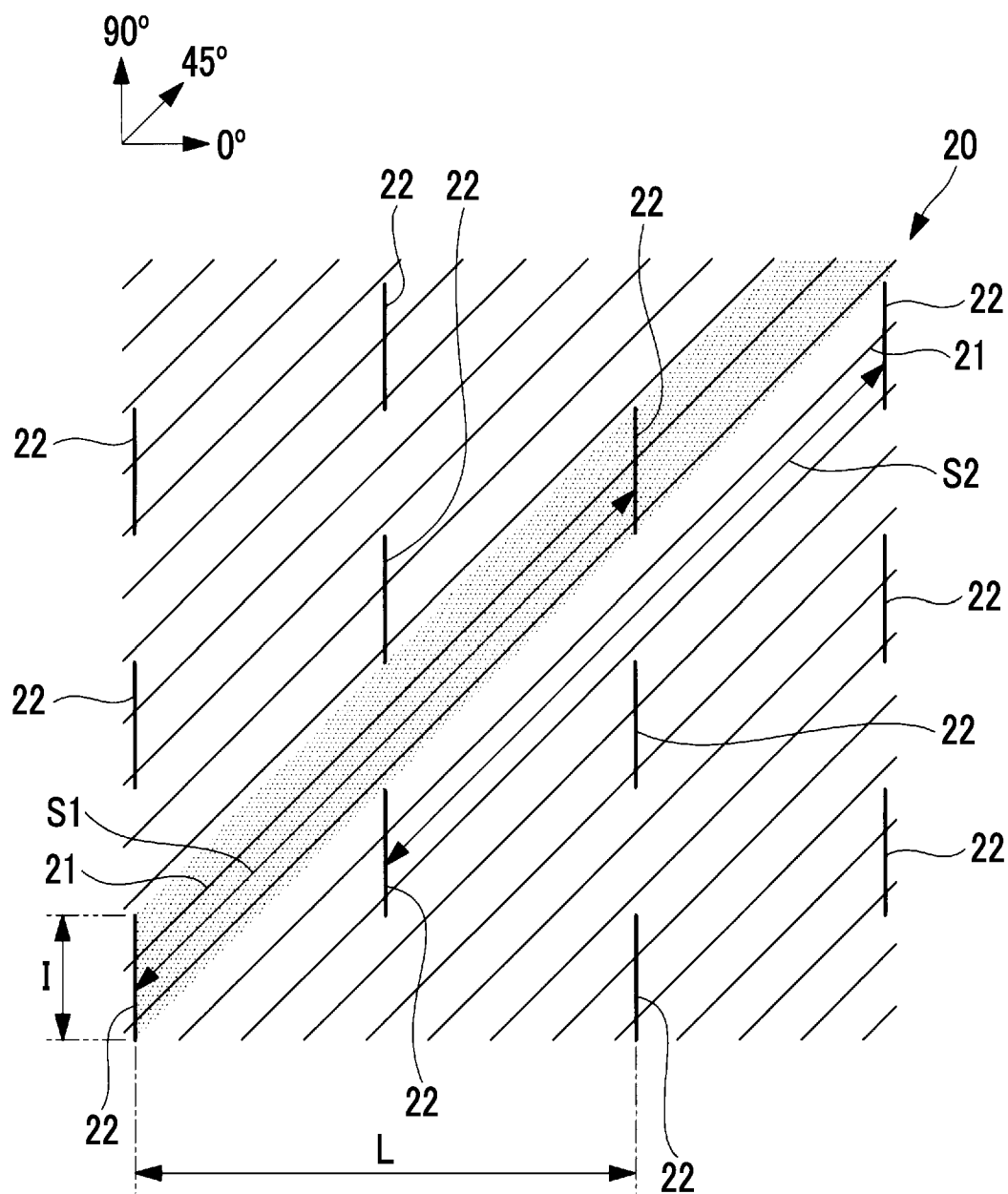
FIG. 3 is a schematic plan view of a second fiber-reinforced sheet that is included in the multi-stack material according to the first embodiment of the present disclosure.

The second fiber-reinforced sheet 20 has a plurality of second fibers 21 extending in a 45-degree direction (a second direction), as shown in FIG. 3. The 45-degree direction is a direction forming an angle of 45 degrees with respect to the 0-degree direction in which the first fibers 11 extend. The oblique line in FIG. 3 indicates the second fiber 21.

Further, as shown in FIG. 3, the second fiber-reinforced sheet 20 has a plurality of second slits 22 that cut the second fibers 21. Each of the second slits 22 extends in the 90-degree direction.

The plurality of second slits 22 are disposed in a zigzag pattern. Further, the plurality of second slits 22 are disposed such that the cut second fibers 21 have the same length. Details of the shape and disposition of the second slit 22 will be described later.

Next, the details of the shape and disposition of each of the first slit 12 and the second slit 22 will be described.

The shapes of the first slit 12 and the second slit 22 are made to be the same shape. Further, each of the first slit 12 and the second slit 22 is formed by forming a slit so as to penetrate the multi-stack material 1 in a state where the first fiber-reinforced sheet 10 and the second fiber-reinforced sheet 20 are laminated, in a lamination direction. Therefore, the first slit 12 and the second slit 22 are disposed so as to overlap each other when the multi-stack material 1 is viewed from the lamination direction. Therefore, in the following, the disposition of the plurality of first slits 12 will be described, and the description of the disposition of the plurality of second slits 22 will be omitted.

As shown in FIG. 2, the plurality of first slits 12 are all formed to have the same shape. Each of the first slits 12 has a length l in the 90-degree direction.

The first slits 12 are formed over multiple rows in the 90-degree direction. In the present embodiment, a first row 13 and a second row 14 are formed so as to be continuous along the 90-degree direction.

The first slits 12 that are formed in the first row 13 are disposed to be spaced apart from each other in the 0-degree direction (an intersection direction) that intersects the 90-degree direction. Further, the first slits 12 that are formed in the first row 13 are disposed side by side at equal intervals (intervals L to be described later) in the 0-degree direction.

The first slits 12 that are formed in the second row 14 are also disposed to be spaced apart from each other in the 0-degree direction. Further, the first slits 12 that are formed in the second row 14 are disposed side by side at equal intervals (intervals L to be described later) in the 0-degree direction. Further, the first slit 12 that is formed in the second row 14 is disposed at the midpoint in the 0-degree direction between the first slits 12 formed in the first row 13 adjacent to the second row 14.

Further, one end in the 90-degree direction of the first slit 12 in the first row 13 and the other end in the 90-degree direction of the first slit 12 in the second row 14 are at the same position in the 90-degree direction. That is, the first slit 12 in the first row 13 and the first slit 12 in the second row 14 are disposed so as not to overlap each other or be separated from each other when viewed from the 0-degree direction.

Further, the plurality of first slits 12 and the plurality of second slits 22 are disposed so as to satisfy the following expression (1).

[Expression 1]

$$l = \frac{L \times \tan\theta}{4n} \quad (1)$$

Here, n is any natural number. θ is an angle that is formed by the direction in which the first fibers 11 extend (the 0-degree direction in the present embodiment) and the direction in which the second fibers 21 extend (the 45-degree direction in the present embodiment). l is the length in the 90-degree direction of the first slit 12. L is the interval between the first slits 12 adjacent to each other in the 0-degree direction.

In the present embodiment, θ is 45 degrees. Therefore, tan θ becomes 1. Further, in the present embodiment, n is 1.

From the above, if the values of e and n are substituted into the above expression (1), the equation, l=L/4, is obtained. That is, the length l of the first slit 12 is a length corresponding to ¼ of L which is the interval between the first slits 12.

Next, a production method for the multi-stack material 1, a production method for the charge 2 that is manufactured from the multi-stack material 1, and a production method for the composite structure 3 that is manufactured from the charge 2 according to the present embodiment will be described.

First, the production method for the multi-stack material 1 will be described.

As shown in FIG. 1, the second fiber-reinforced sheet 20 is laminated on the first fiber-reinforced sheet 10, and the first fiber-reinforced sheet 10 and the second fiber-reinforced sheet 20 are fixed by sewing them with thread such as glass fiber. Next, a plurality of slits are formed in the first fiber-reinforced sheet 10 and the second fiber-reinforced sheet 20 in a fixed state by a rotating cutter or the like. The slits are formed so as to penetrate the first fiber-reinforced sheet 10 and the second fiber-reinforced sheet 20 in the lamination direction. These slits become the first slit 12 in the first fiber-reinforced sheet 10 and the second slit 22 in the second fiber-reinforced sheet 20. The plurality of slits are formed so as to have the disposition described above. In this way, the multi-stack material 1 is manufactured.

Next, the production method for the charge 2 will be described.

The charge 2 having a flat or nearly flat shape is manufactured by laminating a plurality of the manufactured multi-stack materials 1.

Next, the production method for the composite structure 3 will be described.

Figure 5:
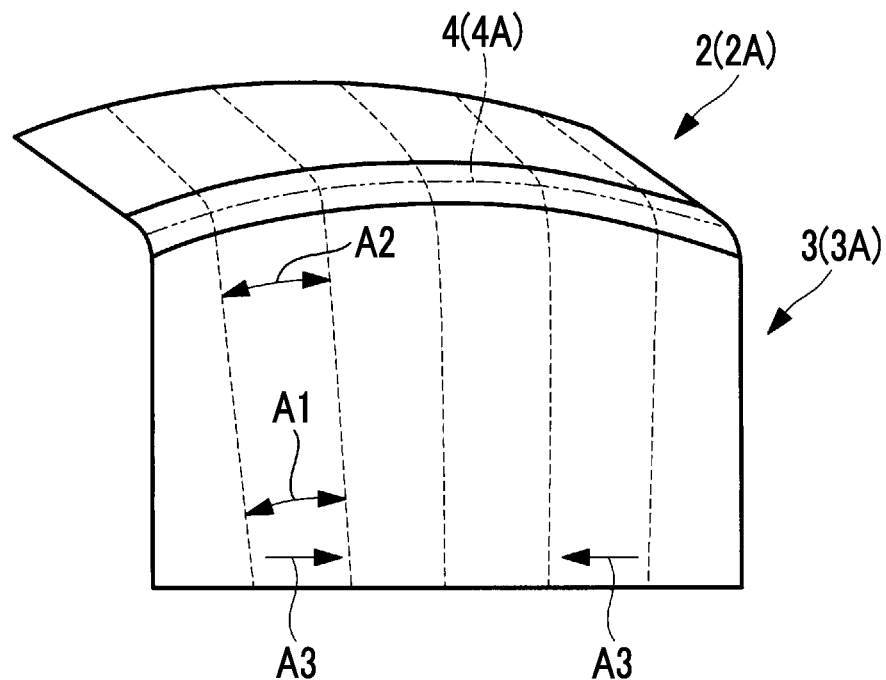
FIG. 5 is a perspective view showing a state where a charge according to an embodiment of the present disclosure is subjected to bending.
Figure 6:
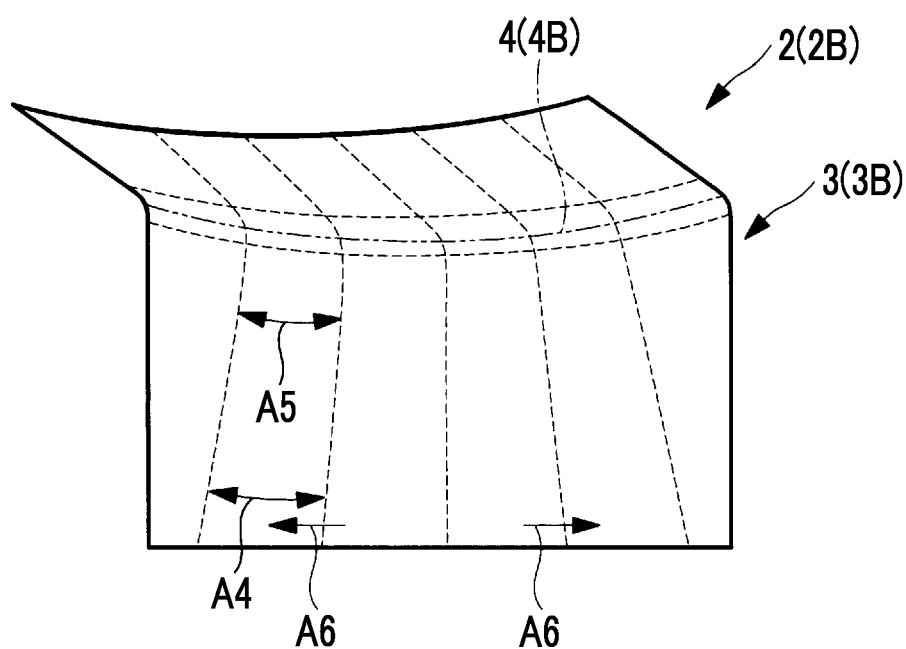
FIG. 6 is a perspective view showing a state where a charge according to an embodiment of the present disclosure is subjected to bending.

Bending is performed on the charge 2. At this time, as shown in FIGS. 5 and 6, the bending is performed such that a bent line 4 is curved. In the example of a charge 2A and a composite structure 3A shown in FIG. 5, a bent line 4A is curved so as to protrude upward. Further, in the example of a charge 2B and a composite structure 3B shown in FIG. 6, a bent line 4B is curved so as to protrude downward. In the following, in a case where it is not necessary to distinguish between the example shown in FIG. 5 and the example shown in FIG. 6, the charge 2, the composite structure 3, and the bent line 4 are simply referred to.

When bending is performed in this manner, a difference in peripheral length occurs in the charge 2. Specifically, in the example shown in FIG. 5, a peripheral length A1 of the portion far from the bent line 4A is shorter than a peripheral length A2 of the portion close to the bent line 4A. In this way, a compressive force acts in the direction indicated by the arrow A3 in the portion having the shorter peripheral length. In the example of FIG. 5, the direction along the bent line 4A is the direction in which the compressive force acts. Further, in the present embodiment, the direction in which the compressive force acts is the 0-degree direction in the multi-stack material 1.

Further, in the example shown in FIG. 6, a peripheral length A4 of the portion far from the bent line 4B is longer than a peripheral length A5 of the portion close to the bent line 4B. In this way, a tensile force acts in the direction indicated by the arrow A6 in the portion having a longer peripheral length. In the example of FIG. 6, the direction along the bent line 4B is the direction in which the tensile force acts. Further, in the present embodiment, the direction in which the tensile force acts is the 0-degree direction in the multi-stack material 1.

When the bending on the charge 2 is ended, the manufacturing of the composite structure 3 is completed.

It is not necessary to form the slits in the entire multi-stack material 1 configuring the charge 2. That is, the slits may be formed only in a part of the multi-stack material 1. For example, a configuration is made such that the slits are formed in the multi-stack material 1 that includes the fiber-reinforced sheet in which the fibers extend in the 0-degree direction and the slit are not formed in the multi-stack material 1 that does not include the fiber-reinforced sheet in which the fibers extend in the 0-degree direction. In this way, it is possible to cut the fibers extending in the 0-degree direction, which tend to cause wrinkles when performing bending, so that the shaping-ability of the charge 2 can be improved. Therefore, the occurrence of wrinkles can be suppressed. Further, since the slits are formed only in a part of the multi-stack materials 1, the manufacturing process of the charge 2 can be simplified compared to a case where the slits are formed in the entire multi-stack material 1.

According to the present embodiment, the following effects are obtained.

In the present embodiment, the first slit 12 and the second slit 22 are formed at once by cutting the first fiber-reinforced sheet 10 and the second fiber-reinforced sheet 20 in the laminated state in the lamination direction. Therefore, the first slit 12 and the second slit 22 can be easily formed compared to a case where the first slit 12 and the second slit 22 are formed separately.

Further, in the present embodiment, one end in the 90-degree direction of each of the first slit 12 and the second slit 22 in the first row 13 and the other end in the 90-degree direction of each of the first slit 12 and the second slit 22 in the second row 14 are at the same position in the 90-degree direction. Further, the disposition of the plurality of first slits 12 and the plurality of second slits 22 is defined by the above expression (1). In this way, in the first fiber-reinforced sheet 10, the first slits 12 can be formed such that the cut first fibers 11 have the same length. Further, in the second fiber-reinforced sheet 20, the second slits 22 can be formed such that the cut second fibers 21 have the same length.

Specifically, one end in the 90-degree direction of each of the first slit 12 and the second slit 22 in the first row 13 and the other end in the 90-degree direction of each of the first slit 12 and the second slit 22 in the second row 14 are at the same position in the 90-degree direction. In this way, as shown in FIG. 2, in the first fiber-reinforced sheet 10, both the length of the first fiber 11 in the first row 13 and the length of the first fiber 11 in the second row 14 become L. That is, in the first fiber-reinforced sheet 10, all the first fibers 11 have the same length.

Further, the disposition of the plurality of first slits 12 and the plurality of second slits 22 is defined by the above expression (1). In this way, as shown in FIG. 3, in the second fiber-reinforced sheet 20, a length S1 of the second fiber 21 extending between the specific second slits 22 (the second fiber 21 existing in a shaded region in FIG. 3) becomes √2(L). Further, a length S2 of the second fiber 21 extending between the other second slits 22 (for example, the second fiber 21 that is present in a region adjacent to the shaded region in FIG. 3) also becomes √2(L). In this manner, in the second fiber-reinforced sheet 20, all the second fibers 21 have the same length.

In this manner, in the above configuration, in the first fiber-reinforced sheet 10 and the second fiber-reinforced sheet 20, the cut first fibers 11 and the cut second fibers 21 can have the same length. Therefore, the lengths of the first fibers 11 and the lengths of the second fibers 21 can be made uniform. Further, since the cut first fiber 11 and the cut second fiber 21 do not have an extremely long length, the length of the first fiber 11 and the length of the second fiber 21 can be set to a predetermined length. Therefore, in any of the first fiber-reinforced sheet 10 and the second fiber-reinforced sheet 20, the strength and the shaping-ability can be made uniform over the entire area, and a predetermined strength and shaping-ability can be secured. Therefore, a decrease in the strength of the multi-stack material 1 can be suppressed. Further, the shaping-ability of the multi-stack material 1 can be improved.

Figure 13:
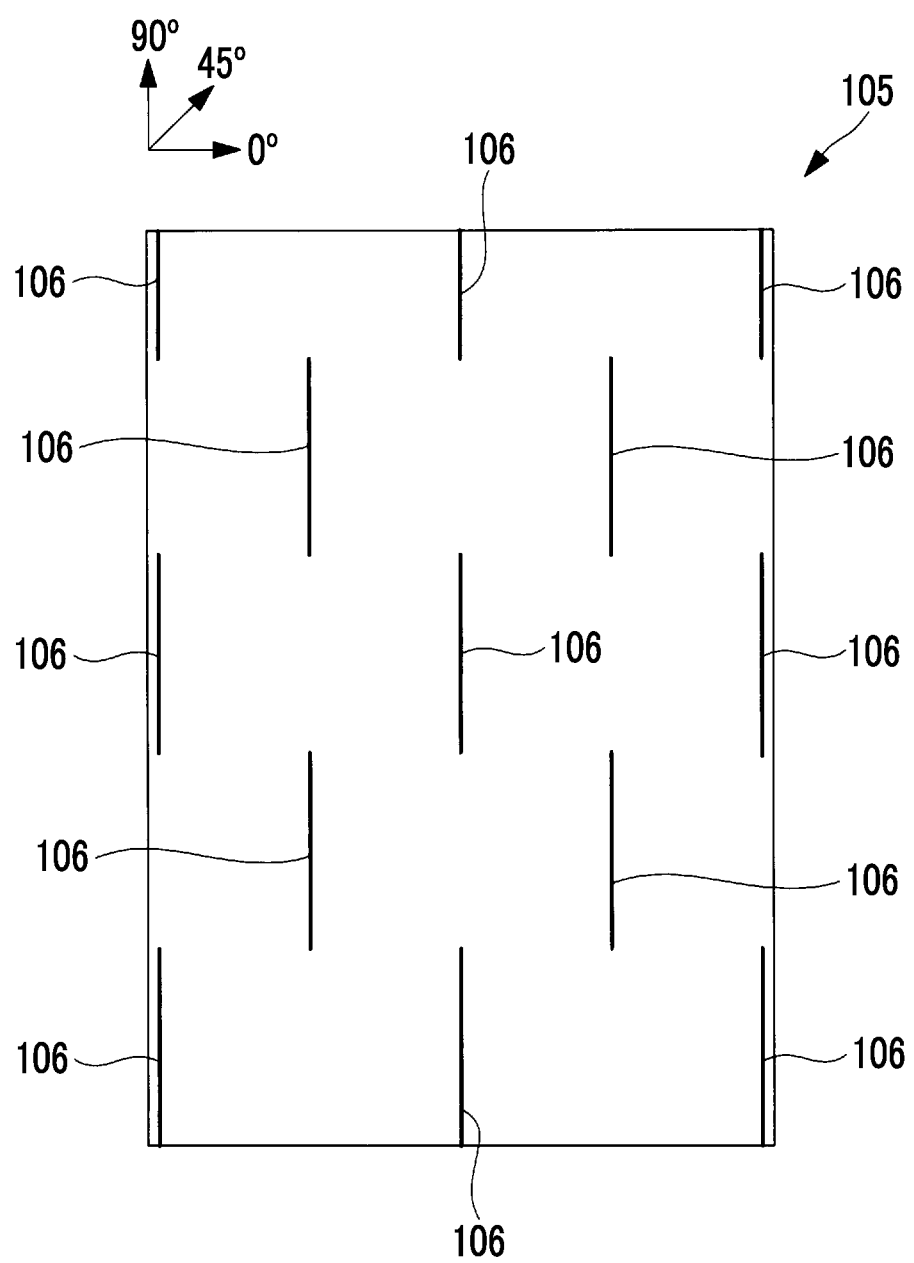
FIG. 13 is a plan view of the multi-stack material according to the reference example shown in FIG. 12.
Figure 14:
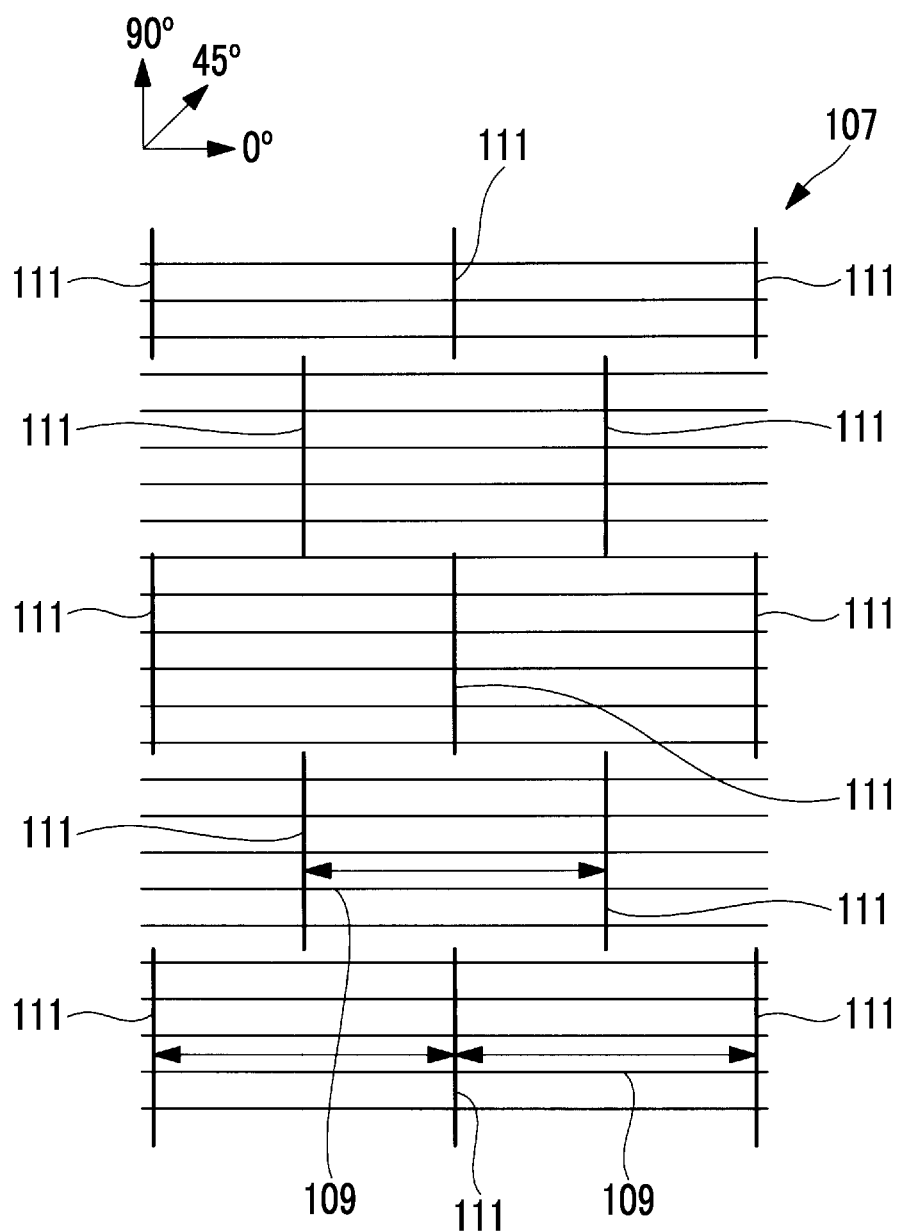
FIG. 14 is a plan view of a first fiber-reinforced sheet that is included in the multi-stack material according to the reference example shown in FIG. 12.
Figure 15:
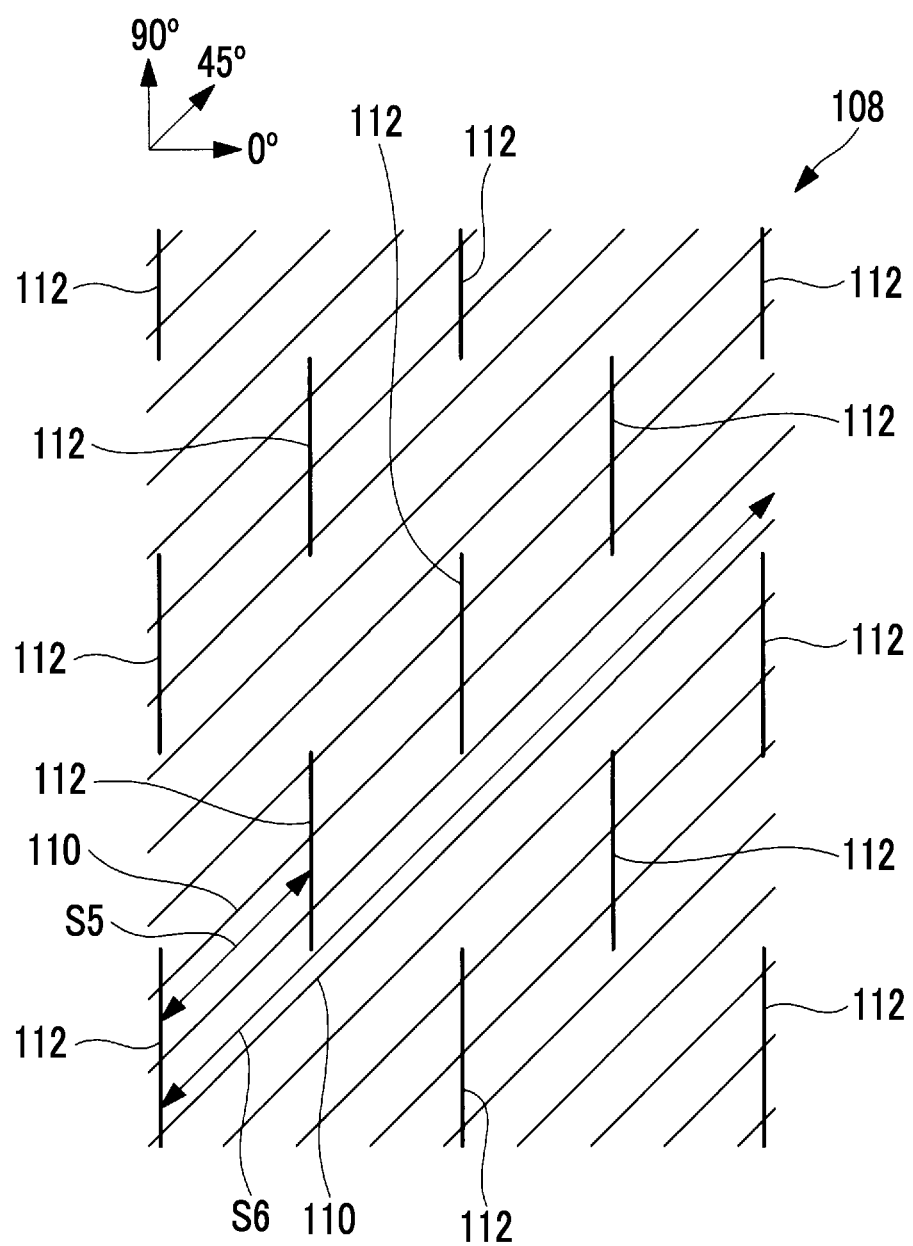
FIG. 15 is a plan view of a second fiber-reinforced sheet that is included in the multi-stack material according to the reference example shown in FIG. 12.

For example, as shown in the reference example of FIG. 13, there is a case where a plurality of slits 106 are formed in a multi-stack material 105 such that the above expression (1) is not satisfied. In this case, for example, even if a plurality of slits are disposed such that one end in the 90-degree direction of the slit in the first row 13 and the other end in the 90-degree direction of the slit in the second row 14 are at the same position in the 90-degree direction, as shown in FIG. 14, in a first fiber-reinforced sheet 107, first fibers 109 that are cut by first slits 111 have the same length. However, as shown in FIG. 15, in a second fiber-reinforced sheet 108, second fibers 110 that are cut by second slits 112 do not have the same length. Specifically, in the second fiber-reinforced sheet 108, short second fibers 110 (refer to an arrow S5) and long second fibers 110 (refer to an arrow S6) are formed. Therefore, in the second fiber-reinforced sheet 108, there is a possibility that a predetermined strength and shaping-ability may not be secured. The line extending in the right-left direction in FIG. 14 indicates the first fiber 109. Further, the oblique line in FIG. 15 indicates the second fiber 110.

Further, when bending is performed on a fiber-reinforced sheet, there is a case where a compressive force or a tensile force act on the fiber-reinforced sheet (refer to FIGS. 5 and 6). The fibers that are included in the fiber-reinforced sheet are difficult to expand and contract in the extending direction of the fibers. Therefore, in a case where the fibers extend along the direction in which a compressive force or a tensile force acts, the fibers cannot absorb the compressive force or the tensile force, so that wrinkles occur in the fiber-reinforced sheet, and there is a case where the strength of the fiber-reinforced sheet decreases.

In the present embodiment, the 0-degree direction in which the first fibers 11 extend and the 45-degree direction in which the second fibers 21 extend are the directions along the direction in which a compressive force or a tensile force acts on the first fiber-reinforced sheet 10 and the second fiber-reinforced sheet 20 when bending is performed on the charge 2. Therefore, the fibers extending in the direction in which a compressive force or a tensile force acts can be cut. Therefore, the shaping-ability of the first fiber-reinforced sheet 10 and the second fiber-reinforced sheet 20 can be improved. Therefore, the occurrence of wrinkles can be suppressed.

The direction along the direction in which the compressive force or the tensile force acts may be a direction other than the direction orthogonal to the direction in which a compressive force or a tensile force acts (the 90-degree direction in the present embodiment).

Figure 4:
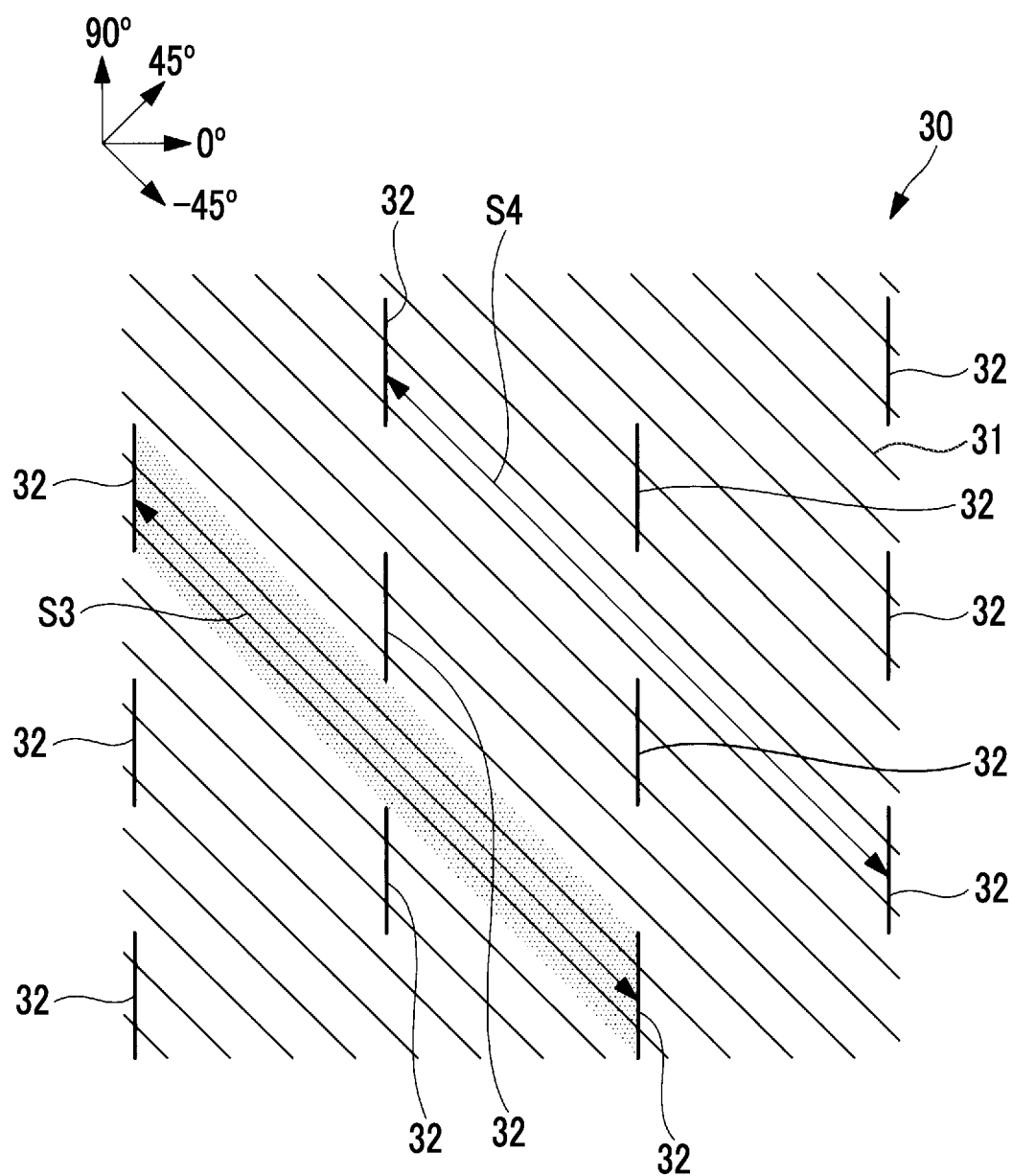
FIG. 4 is a schematic plan view of a third fiber-reinforced sheet that is included in the multi-stack material according to a modification example of the first embodiment of the present disclosure.

In the above description, an example in which the multi-stack material 1 is composed of the first fiber-reinforced sheet 10 and the second fiber-reinforced sheet 20 has been described. However, the present disclosure is not limited to this. For example, the multi-stack material 1 may have a third fiber-reinforced sheet 30. The third fiber-reinforced sheet 30 has a plurality of third fibers 31 extending in a −45-degree direction, as shown in FIG. 4. The −45-degree direction is a direction that forms the angle of 45 degrees with respect to the 0-degree direction, which is the direction in which the first fibers 11 extend, and is a direction that forms the angle of 90 degrees with respect to the 45-degree direction, which is the direction in which the second fibers 21 extend. The oblique line in FIG. 4 indicates the third fiber 31.

Further, as shown in FIG. 4, the third fiber-reinforced sheet 30 has a plurality of third slits 32 that cut the third fibers 31. The plurality of third slits 32 are disposed in a zigzag pattern. Further, the plurality of third slits 32 are disposed such that the cut third fibers 31 have the same length. The third slit 32 is disposed so as to overlap with the first slit 12 and the second slit 22 when the multi-stack material 1 is viewed from the lamination direction. Since the shape and disposition of the third slit 32 are the same as those of the first slit 12 and the second slit 22 described above, detailed description thereof will be omitted.

Also in the third fiber-reinforced sheet 30, a length S3 of the third fiber 31 extending between the specific third slits 32 (the third fiber 31 that is present in a shaded region in FIG. 4) becomes $\sqrt{2}(L)$. Further, a length S4 of the third fiber 31 extending between the other third slits 32 also becomes $\sqrt{2}(L)$. In this manner, in the third fiber-reinforced sheet 30, all the third fibers 31 have the same length.

Modification Example 1

Figure 7:
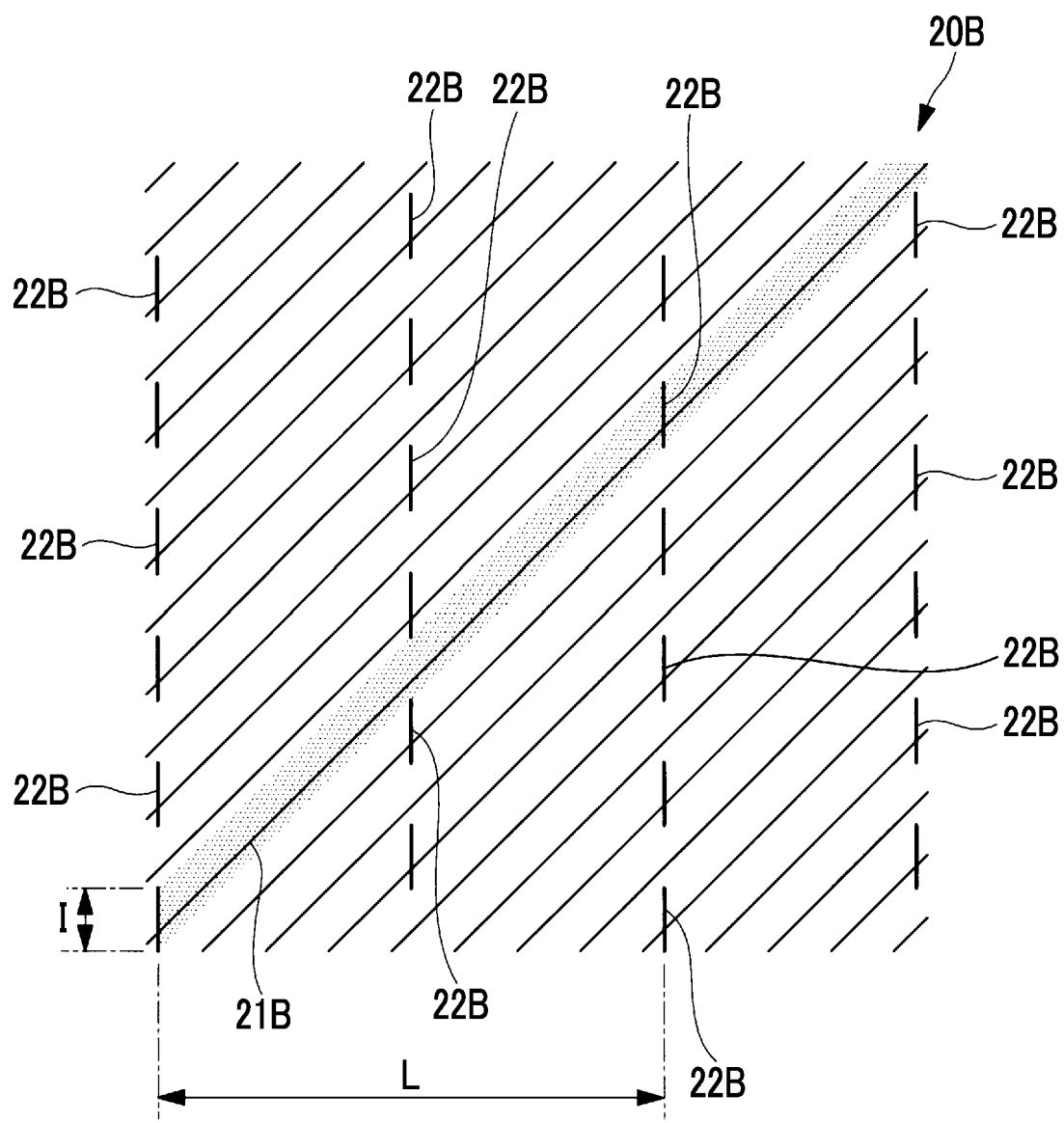
FIG. 7 is a schematic plan view showing a modification example of FIG. 3.

In the first embodiment, a case has been description in which a natural number that is substituted into the above expression (1) is 1. However, the natural number n that is substituted into the above expression (1) may be a natural number other than 1. In FIG. 7, shown is the disposition of a second slit 22B in a case where n is 2. θ is 45 degrees, as in the first embodiment. In this case, the equation, l=L/8, is obtained. That is, the length l of the second slit 22B is a length corresponding to ⅛ of L which is the interval between the second slits 22B.

In this manner, even in the case of the modification example, in the first fiber-reinforced sheet 10, the first slits 12 can be formed such that the cut first fibers 11 have the same length. Further, in a second fiber-reinforced sheet 20B, the second slits 22B can be formed such that cut second fibers 21B have the same length. The oblique line in FIG. 7 indicates the second fiber 21B.

In a case where the length l of the slit is long, the effect is obtained in which the fibers are easily cut and the shaping-ability is improved. Further, in a case where the length l of the slit is short, the effect is obtained in which shape retainability is improved. The length l of the slit (in other words, the natural number n) may be determined according to the shape or the like of the composite structure 3 to be manufactured, in consideration of such merits.

Second Embodiment

Next, a second embodiment of the present disclosure will be described using FIG. 8.

The multi-stack material 1 according to the present embodiment is difference from that of the first embodiment in that the direction in which second fibers 21C of a second fiber-reinforced sheet 20C extend is a 30-degree direction. Further, the multi-stack material 1 according to the present embodiment is difference from that of the first embodiment in that the length l of the slit that is formed in the multi-stack material 1 is different from that in the first embodiment. Since the other points are the same as those of the first embodiment, the same configurations are denoted by the same reference numerals, and detailed description thereof will be omitted.

Figure 8:
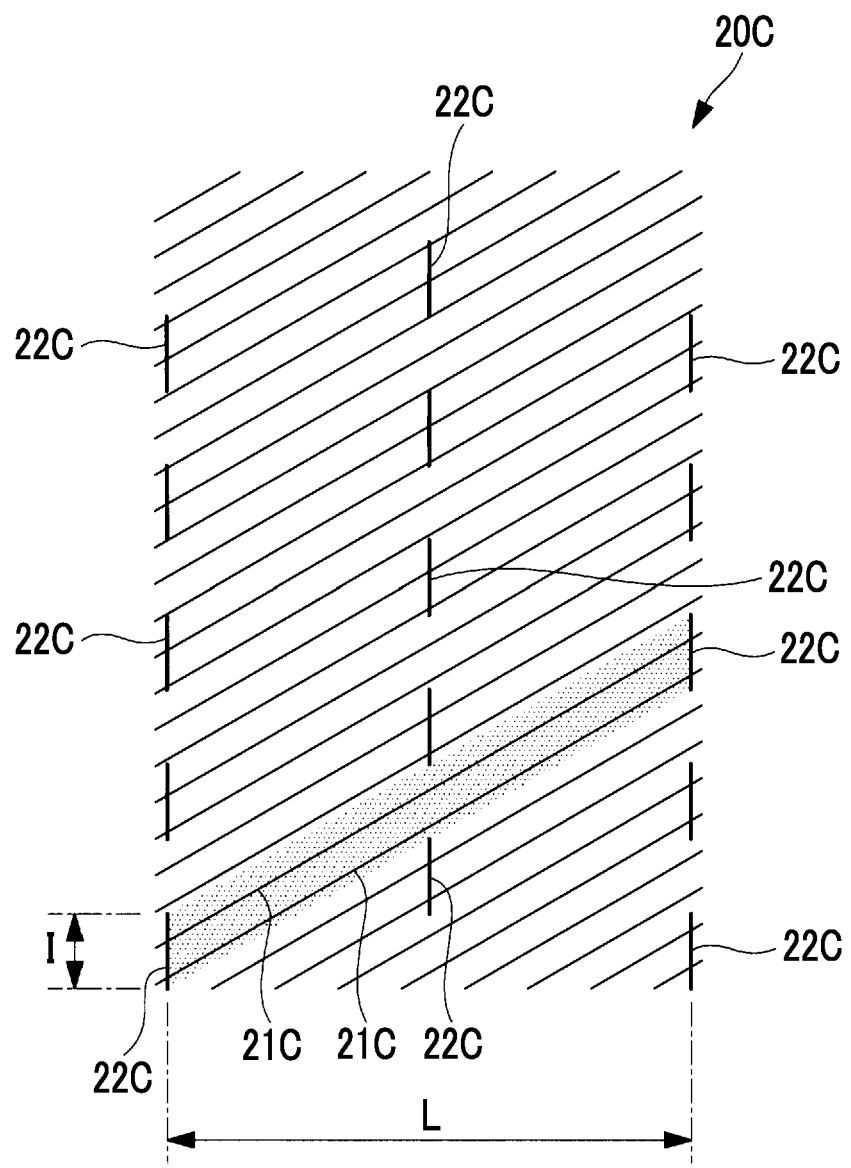
FIG. 8 is a schematic plan view of a second fiber-reinforced sheet that is included in a multi-stack material according to a second embodiment of the present disclosure.

As shown in FIG. 8, the second fiber-reinforced sheet 20C according to the present embodiment has a plurality of second fibers 21C extending in the 30-degree direction (the second direction). The 30-degree direction is a direction that forms the angle of 30 degrees with respect to the 0-degree direction, which is the direction in which the first fibers 11 extend. In this manner, in the present embodiment, θ is 30 degrees. Therefore, tan θ becomes $1/\sqrt{3}$. Further, also in the present embodiment, n is 1.

From the above, when the values of e and n are substituted into the above expression (1), the equation, $l=L/(4\sqrt{3})$, is obtained. That is, the length l of the first slit 12 is a length corresponding to $1/(4\sqrt{3})$ of L which is the interval between the first slits 12.

In this way, as shown in FIG. 8, in the second fiber-reinforced sheet 20C, the length of the second fiber 21C extending between specific second slits 22C (the second fiber 21C that is present in the shaded regions in FIG. 8) becomes $(2/\sqrt{3})L$. Further, the length of the second fiber 21C extending between other second slits 22C (for example, the second fiber 21C that is present in a region adjacent to the shaded region in FIG. 8) also becomes $(2/\sqrt{3})L$. In this manner, in the second fiber-reinforced sheet 20C, all the second fibers 21C have the same length. Therefore, also in the present embodiment, the same effects as those of the first embodiment are obtained. The oblique line in FIG. 8 indicates the second fiber 21C.

As described above, even if the angle θ that is formed by the direction in which the first fibers extend and the direction in which the second fibers extend is an angle other than 45 degrees described in the first embodiment, in the second fiber-reinforced sheet, the lengths of the cut second fibers can be made equal.

Modification Example 2

Figure 9:
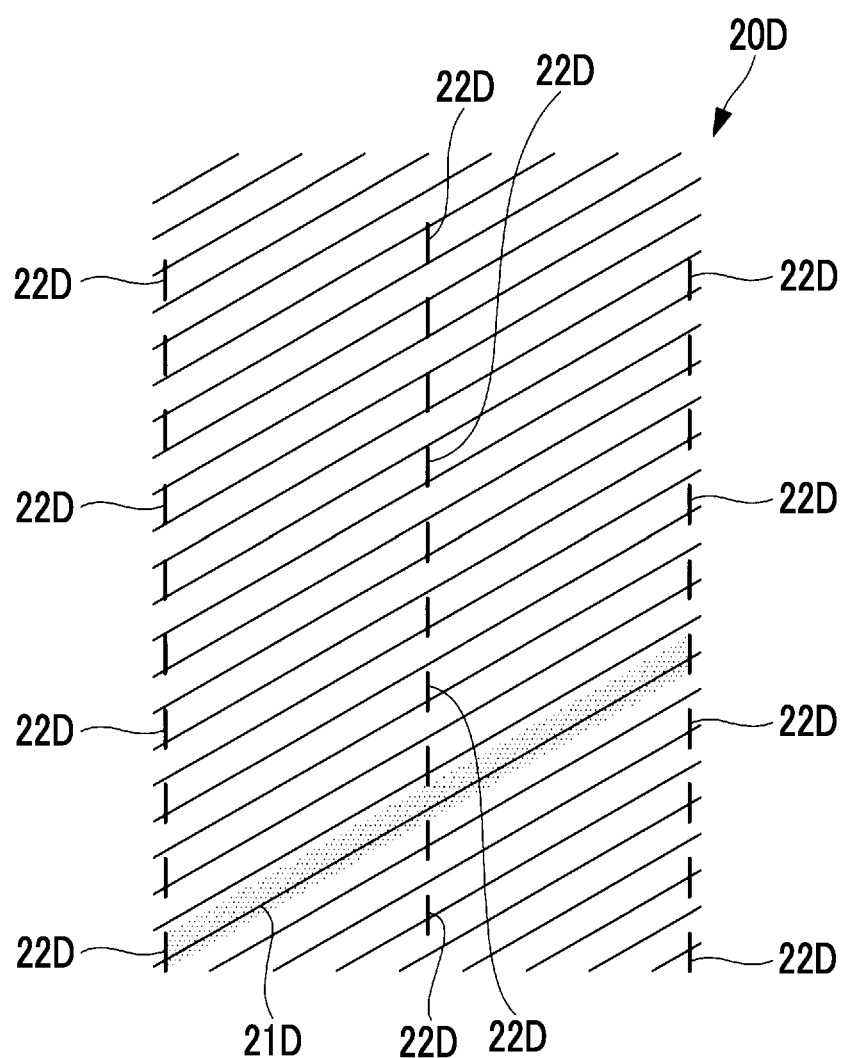
FIG. 9 is a schematic plan view showing a modification example of FIG. 8.

In the second embodiment, a case has been described in which the natural number that is substituted into the above expression (1) is 1. However, the natural number n that is substituted into the above expression (1) may be a natural number other than 1. In FIG. 9, shown is the disposition of a second slit 22D in a case where n is 2. θ is 30 degrees, as in the second embodiment. In this case, the equation, $l=L/(8\sqrt{3})$, is obtained. That is, the length l of the second slit 22D is a length corresponding to $1/(8\sqrt{3})$ of L which is the interval between the second slits 22D.

In this manner, even in the case of the modification example, the second slits 22D can be formed such that the cut second fibers 21D have the same length in the second fiber-reinforced sheet 20D. The oblique line in FIG. 9 indicates the second fiber 21D.

Third Embodiment

Next, a third embodiment of the present disclosure will be described using FIG. 10.

The multi-stack material 1 according to the present embodiment is different from that of the first embodiment in that the direction in which a second fiber 41 of a second fiber-reinforced sheet 40 extends is the 90-degree direction. Further, the present embodiment is different from the first embodiment in that the shape and disposition of a slit that is formed in the multi-stack material 1 are different from those in the first embodiment. Since the other points are the same as those of the first embodiment, the same configurations are denoted by the same reference numerals, and detailed description thereof will be omitted. In FIG. 10, for illustration purposes, both the first fibers 11 of the first fiber-reinforced sheet 10 and the second fibers 41 of the second fiber-reinforced sheet 40 are shown in the multi-stack material 1 viewed from in a plan view. Further, the line in a longitudinal direction in FIG. 10 indicate the first fiber 11. Further, the line in the right-left direction in FIG. 10 indicate the second fiber 41.

Figure 10:
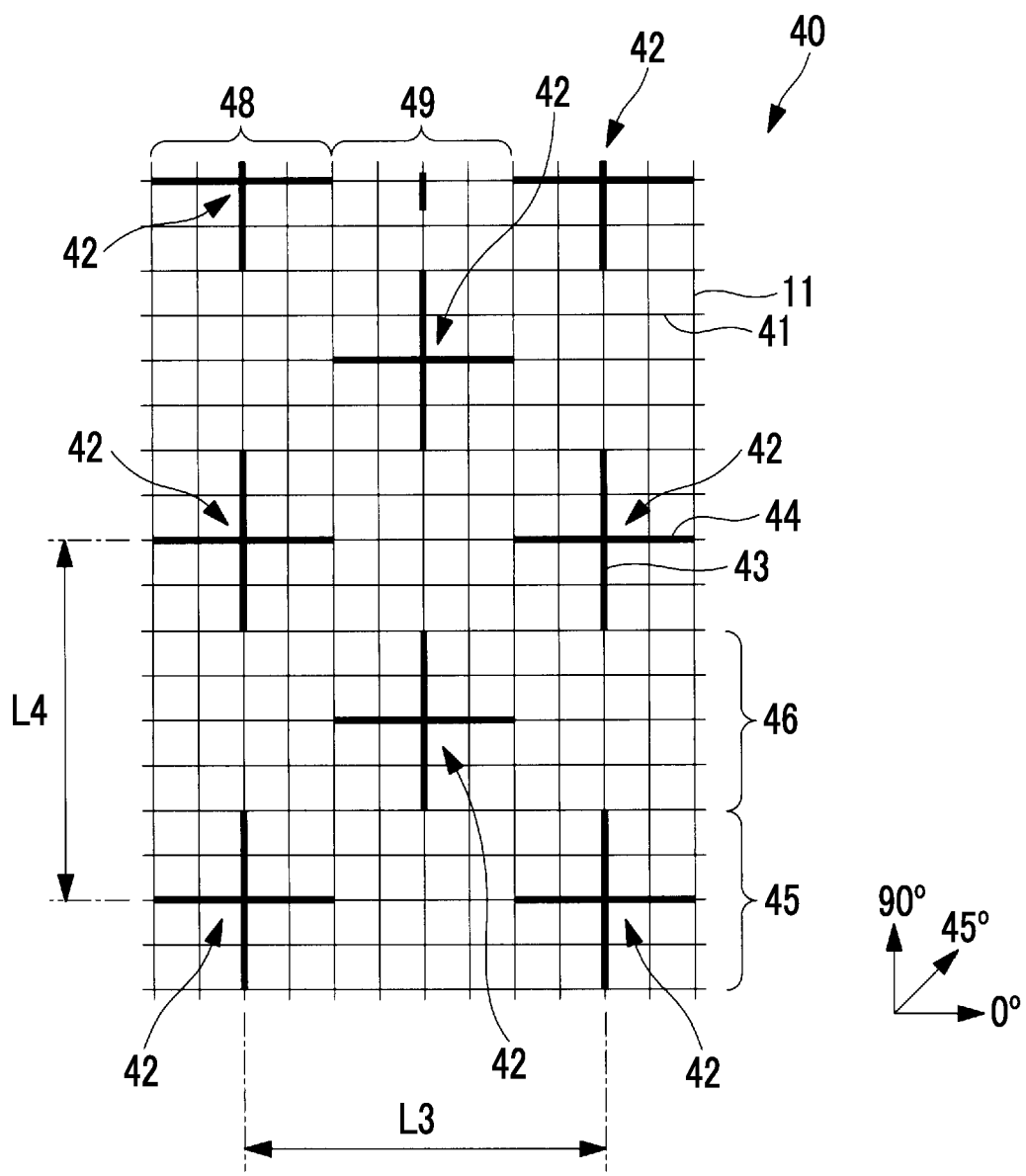
FIG. 10 is a schematic plan view of a fiber-reinforced sheet that is included in a multi-stack material according to a third embodiment of the present disclosure.

In the second fiber-reinforced sheet 40 according to the present embodiment, as shown in FIG. 10, the second fibers 41 extend in the 90-degree direction (the second direction). The 90-degree direction is a direction that forms the angle of 90 degrees with respect to the 0-degree direction, which is the direction in which the first fibers 11 extend.

A slit 42 of the present embodiment includes a first direction slit 43 extending in the 90-degree direction and a second direction slit 44 extending in the 0-degree direction. The first direction slit 43 and the second direction slit 44 are disposed so as to form a cross shape.

A plurality of first direction slits 43 are formed over multiple rows in the 90-degree direction. Further, a first row 45 and a second row 46 are formed so as to be continuous along the 90-degree direction. The first direction slits 43 that are formed in the first row 45 are disposed to be spaced apart from each other in the 0-degree direction, which is a direction intersecting the 90-degree direction. Further, the first direction slits 43 that are formed in the first row 45 are disposed side by side at equal intervals (intervals L3) in the 0-degree direction.

The first direction slits 43 that are formed in the second row 46 are also disposed to be spaced apart from each other in the 0-degree direction. Further, the first direction slits 43 that are formed in the second row 46 are disposed side by side at equal intervals (intervals L3) in the 0-degree direction. Further, the first direction slit 43 that is formed in the second row 46 is disposed at the midpoint in the 0-degree direction between the first direction slits 43 formed in the first row 45 adjacent to the second row 46.

Further, one end in the 90-degree direction of the first direction slit 43 in the first row 45 and the other end in the 90-degree direction of the first direction slit 43 in the second row 46 are at the same position in the 90-degree direction.

Further, a plurality of second direction slits 44 are formed over multiple rows in the 0-degree direction. Further, a first row 48 and a second row 49 are formed so as to be continuous along the 0-degree direction. The second direction slits 44 that are formed in the first row 48 are disposed to be spaced apart from each other in the 90-degree direction, which is a direction intersecting the 0-degree direction. Further, the second direction slits 44 that are formed in the first row 48 are disposed side by side at equal intervals (intervals L4) in the 0-degree direction.

The second direction slits 44 that are formed in the second row 49 are also disposed to be spaced apart from each other in the 90-degree direction. Further, the second direction slits 44 that are formed in the second row 49 are disposed side by side at equal intervals (intervals L4) in the 90-degree direction. Further, the second direction slit 44 that is formed in the second row 49 is disposed at the midpoint in the 90-degree direction between the second direction slits 44 formed in the first row 48 adjacent to the second row 49.

Further, one end in the 0-degree direction of the second direction slit 44 in the first row 48 and the other end in the 0-degree direction of the second direction slit 44 in the second row 49 are at the same position in the 0-degree direction.

Even in a case where the slits are formed in this manner, in the first fiber-reinforced sheet 10, the cut first fibers 11 can be made to have the same length. Further, in the second fiber-reinforced sheet 40, the cut second fibers 41 can be made to have the same length. Therefore, also in the present embodiment, the same effects as those of the first embodiment are obtained.

The interval L3 and the interval L4 may have the same length, or may have different lengths.

Modification Example 3

Figure 11:
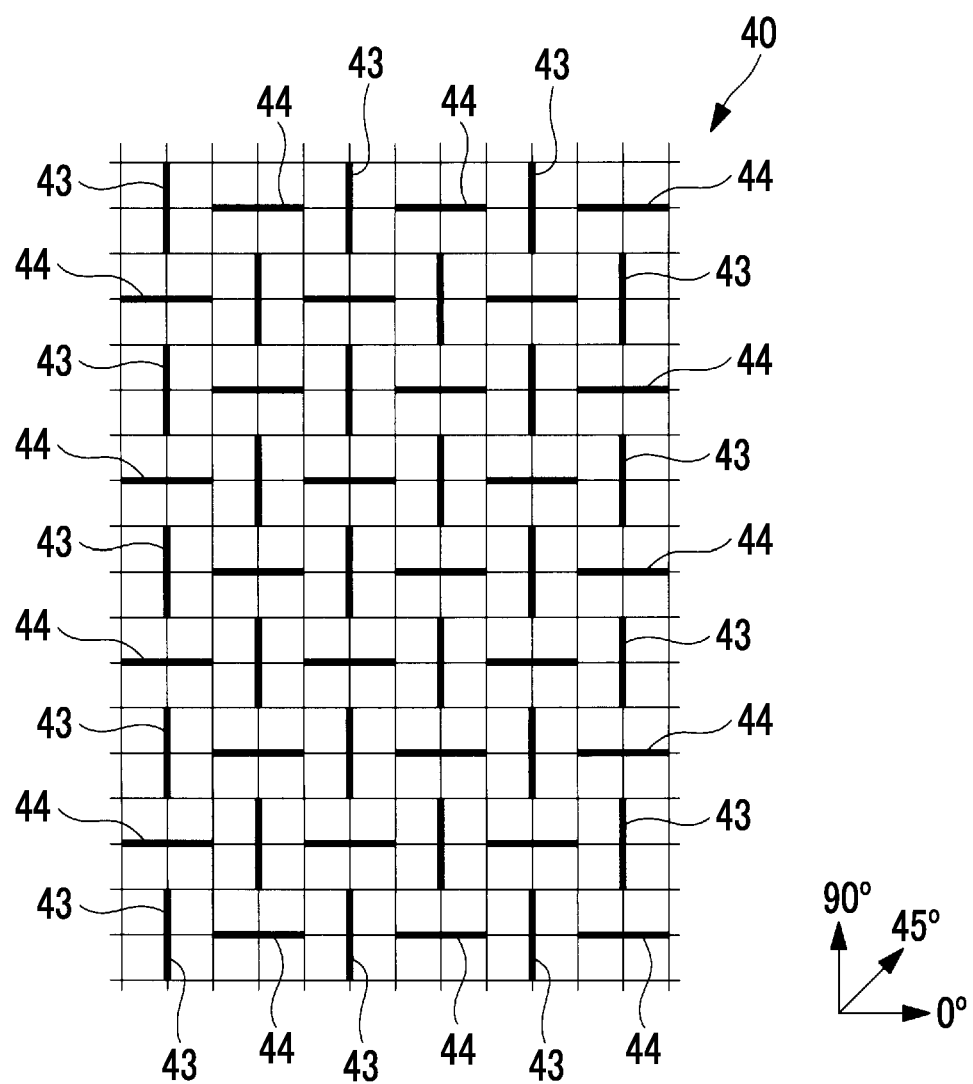
FIG. 11 is a schematic plan view showing a modification example of FIG. 10.
Figure 12:
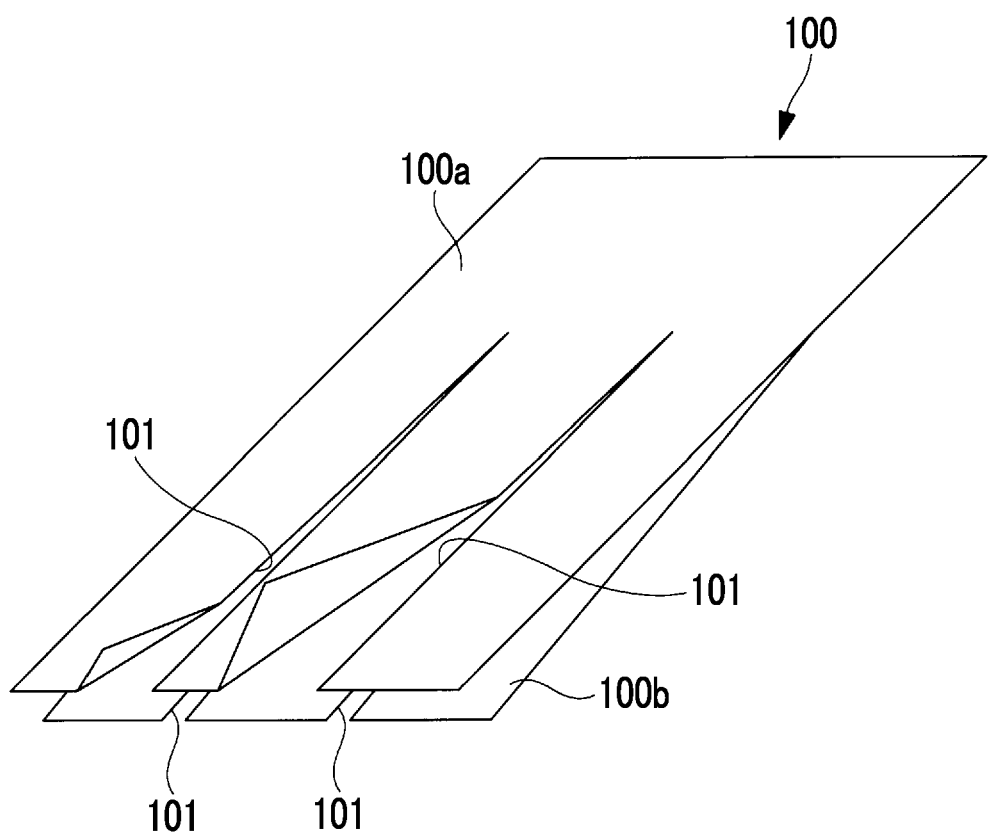
FIG. 12 is a perspective view of a multi-stack material according to a reference example.

The first direction slits 43 and the second direction slits 44 may be disposed side by side at predetermined intervals along the 90-degree direction and the 0-degree direction, as shown in FIG. 11.

The present disclosure is not limited to each of the embodiments described above, and can be appropriately modified within a scope which does not depart from the gist of the present disclosure.

For example, in the above embodiments, an example in which a dry fiber-reinforced sheet is used as the fiber-reinforced sheet has been described. However, the present disclosure is not limited to this. For example, as the fiber-reinforced sheet, a fiber-reinforced sheet (for example, prepreg or the like) in which fibers are infiltrated with resin may be used.

The fiber-reinforced sheet laminate, the production method for a fiber-reinforced sheet laminate, and the production method for a structure described in each embodiment are grasped, for example, as follows.

A fiber-reinforced sheet laminate according to an aspect of the present disclosure is a fiber-reinforced sheet laminate (1) including a plurality of fiber-reinforced sheets (10, 20) that are laminated, in which the plurality of fiber-reinforced sheets include a first fiber-reinforced sheet (10) in which first fibers (11) extend in a first direction, and a second fiber-reinforced sheet (20) in which second fibers (21) extend in a second direction different from the first direction, the first fiber-reinforced sheet has a plurality of first slits (12) that cut the first fibers such that the cut first fibers have the same length, the second fiber-reinforced sheet has a plurality of second slits (22) that cut the second fibers such that the cut second fibers have the same length, and the first slit and the second slit are disposed to overlap each other when viewed from a lamination direction.

In the above configuration, the first slit and the second slit are disposed so as to overlap each other when viewed from the lamination direction. In this way, the first slit and the second slit can be formed at once by simply forming a slit in the first fiber-reinforced sheet and the second fiber-reinforced sheet in the laminated state in the lamination direction. Therefore, the first slit and the second slit can be easily formed compared to a case where the first slit and the second slit are formed separately. Further, since the first slit and the second slit are disposed so as to overlap each other, even in a state where the first fiber-reinforced sheet and the second fiber-reinforced sheet are laminated, the first slit and the second slit can be formed.

Further, in the above configuration, the first slits are formed such that the cut first fibers have the same length. Further, the second slits are formed such that the cut second fibers have the same length. In this way, in the first fiber-reinforced sheet and the second fiber-reinforced sheet, the lengths of the cut first fibers and second fibers can be made uniform. Further, since the cut first fibers and second fibers do not have an extremely long length, the lengths of the first and second fibers can be set to a predetermined length. Therefore, in any of the first fiber-reinforced sheet and the second fiber-reinforced sheet, strength and shaping-ability can be made uniform over the entire area, and predetermined strength and shaping-ability can be secured. Therefore, a decrease in the strength of the fiber-reinforced sheet laminate can be suppressed. Further, it is possible to improve the shaping-ability of the fiber-reinforced sheet laminate.

The shaping-ability indicates the ease of shaping into a desired shape when a fiber-reinforced sheet or a fiber-reinforced sheet laminate is deformed.

In the fiber-reinforced sheet laminate according to an aspect of the present disclosure, the first slit and the second slit extend in a predetermined direction, the plurality of first slits and second slits are formed over multiple rows in the predetermined direction, the first and second slits that are formed in a first row (13) in the predetermined direction are disposed to be spaced apart from each other in an intersection direction that is a direction intersecting the predetermined direction, the first and second slits that are formed in a second row (14) in the predetermined direction are disposed at the midpoint in the intersection direction between the first and second slits formed in the first row adjacent to the second row, one end in the predetermined direction of each of the first slit and the second slit in the first row and the other end in the predetermined direction of each of the first slit and the second slit in the second row are at the same position in the predetermined direction, and disposition of the plurality of first slits and the plurality of second slits is defined by a following expression (2).

[Expression 2]

$$l = \frac{L \times \tan\theta}{4n} \quad (2)$$

Here, n is a natural number.

θ is an angle that is formed by the first direction and the second direction.

l is the length in a predetermined direction of each of the first slit and the second slit.

L is the interval in the intersection direction between the first and second slits adjacent to each other in the intersection direction.

In the above configuration, the disposition of the plurality of first slits and the plurality of second slits is defined by the above expression (2). In this way, in the first fiber-reinforced sheet, the first slits can be formed such that the cut first fibers have the same length. Further, in the second fiber-reinforced sheet, the second slits can be formed such that the cut second fibers have the same length. Therefore, in any of the first fiber-reinforced sheet and the second fiber-reinforced sheet, strength and shaping-ability can be made uniform over the entire area, and predetermined strength and shaping-ability can be secured. Therefore, a decrease in the strength of the fiber-reinforced sheet laminate can be suppressed. Further, it is possible to improve the shaping-ability of the fiber-reinforced sheet laminate.

In the fiber-reinforced sheet laminate according to an aspect of the present disclosure, the first direction and the second direction are directions along the direction in which a compressive force or a tensile force acts on the first fiber-reinforced sheet and the second fiber-reinforced sheet when bending is performed on the first fiber-reinforced sheet and the second fiber-reinforced sheet.

If bending is performed on a fiber-reinforced sheet, there is a case where a compressive force or a tensile force acts on the fiber-reinforced sheet. The fibers that are included in the fiber-reinforced sheet are difficult to expand and contract in the extending direction of the fibers. Therefore, in a case where the fibers extend along the direction in which a compressive force or a tensile force acts, the fibers cannot absorb the compressive force or the tensile force, so that wrinkles occur in the fiber-reinforced sheet, and there is a case where the strength of the fiber-reinforced sheet decreases.

In the above configuration, the first direction in which the first fibers extend and the second direction in which the second fibers extend are the directions along the direction in which a compressive force or a tensile force acts on the first fiber-reinforced sheet and the second fiber-reinforced sheet when bending is performed on the first fiber-reinforced sheet and the second fiber-reinforced sheet. Therefore, the fibers extending in the direction in which a compressive force or a tensile force acts can be cut. Therefore, the shaping-ability of the first fiber-reinforced sheet and the second fiber-reinforced sheet can be improved.

The direction along the direction in which a compressive force or a tensile force acts may be a direction other than the direction orthogonal to the direction in which a compressive force or a tensile force acts.

A production method for a fiber-reinforced sheet laminate according to an aspect of the present disclosure includes a lamination step of laminating a first fiber-reinforced sheet (10) having first fibers (11) extending in a first direction and a second fiber-reinforced sheet (20) having second fibers (21) extending in a second direction different from the first direction, and a slitting step of forming a plurality of slits in the laminated first fiber-reinforced sheet and second fiber-reinforced sheet to cut the first fibers and the second fibers, in which in the slitting step, the slits are formed such that the first fibers are cut such that the cut first fibers have the same length and the second fibers are cut such that the cut second fibers have the same length.

In the above configuration, the slits are formed such that the cut first fibers and the cut second fibers have the same length. In this way, in the first fiber-reinforced sheet and the second fiber-reinforced sheet, the lengths of the cut fibers can be made uniform. Further, since the cut fibers do not have an extremely long length, the length of the fiber can be set to a predetermined length. Therefore, in any of the first fiber-reinforced sheet and the second fiber-reinforced sheet, strength and shaping-ability can be made uniform over the entire area, and predetermined strength and shaping-ability can be secured. Therefore, a decrease in the strength of the fiber-reinforced sheet laminate can be suppressed. Further, it is possible to improve the shaping-ability of the fiber-reinforced sheet laminate.

In the production method for a fiber-reinforced sheet laminate according to an aspect of the present disclosure, the slits extends in a predetermined direction, and in the slitting step, the plurality of slits are formed over multiple rows in the predetermined direction, the slits that are formed in a first row (13) in the predetermined direction are disposed to be spaced apart from each other in an intersection direction that is a direction intersecting the predetermined direction, the slits that are formed in a second row (14) in the predetermined direction are disposed at the midpoint in the intersection direction between the slits formed in the first row adjacent to the second row, one end in the predetermined direction of the slit in the first row and the other end in the predetermined direction of the slit in the second row are at the same position in the predetermined direction, and the plurality of slits are formed such that disposition of the plurality of slits is defined by a following expression (3).

[Expression 3]

$$l = \frac{L \times \tan\theta}{4n} \quad (3)$$

Here, n is a natural number.

θ is an angle that is formed by the first direction and the second direction.

l is the length in a predetermined direction of the slit.

L is the interval in the intersection direction between the slits adjacent to each other in the intersection direction.

A production method for a structure according to an aspect of the present disclosure is a production method for a structure in which a structure (3) is manufactured from the fiber-reinforced sheet laminate manufactured by the production method for a fiber-reinforced sheet laminate according to any of the above aspects, the method including a bending step of performing bending on the first fiber-reinforced sheet and the second fiber-reinforced sheet such that a compressive force or a tensile force acts in the first direction and the second direction.

In the above configuration, bending is performed on the first fiber-reinforced sheet and the second fiber-reinforced sheet such that a compressive force or a tensile force acts in the first direction and the second direction. Therefore, in the slitting step, the fibers extending in the direction in which a compressive force or a tensile force acts are cut. Therefore, the shaping-ability of the first fiber-reinforced sheet and the second fiber-reinforced sheet can be improved.

REFERENCE SIGNS LIST

1: multi-stack material (fiber-reinforced sheet laminate)
2: charge
2A: charge
2B: charge
3: composite structure (structure)
3A: composite structure (structure)
3B: composite structure (structure)
4: bent line
4A: bent line
4B: bent line
10: first fiber-reinforced sheet
11: first fiber
12: first slit
13: first row
14: second row
20: second fiber-reinforced sheet
20B: second fiber-reinforced sheet
20C: second fiber-reinforced sheet
20D: second fiber-reinforced sheet
21: second fiber
21B: second fiber
21C: second fiber
21D: second fiber
22: second slit
22B: second slit
22C: second slit
22D: second slit
30: third fiber-reinforced sheet
31: third fiber
32: third slit
40: second fiber-reinforced sheet
41: second fiber
42: slit
43: first direction slit
44: second direction slit
45: first row
46: second row
48: first row
49: second row

The invention claimed is:

1. A fiber-reinforced sheet laminate comprising:
a plurality of fiber-reinforced sheets that are laminated, wherein the plurality of fiber-reinforced sheets include a first fiber-reinforced sheet in which first fibers extend in a first direction, and a second fiber-reinforced sheet in which second fibers extend in a second direction different from the first direction,
the first fiber-reinforced sheet has a plurality of first slits that cut the first fibers such that the cut first fibers have a same first length,
the second fiber-reinforced sheet has a plurality of second slits that cut the second fibers such that the cut second fibers have a same second length, and
each of the first slits and a corresponding one the second slits are disposed in overlapping alignment, when viewed from a lamination direction,
wherein the first slit and the second slit extend in a predetermined direction,
the plurality of first slits and second slits are formed over multiple rows in the predetermined direction,
the first slit and the second slit that are formed in a first row in the predetermined direction are disposed to be spaced apart from each other in an intersection direction that is a direction intersecting the predetermined direction,
the first slit and the second slit that are formed in a second row in the predetermined direction are disposed at a midpoint in the intersection direction between the first and second slits formed in the first row adjacent to the second row,
one end in the predetermined direction of each of the first slit and the second slit in the first row and the other end in the predetermined direction of each of the first slit and the second slit in the second row are at the same position in the predetermined direction, and
disposition of the plurality of first slits and the plurality of second slits is defined by the following expression (1),

[Expression 1]

$$l = \frac{L \times \tan\theta}{4n} \quad (1)$$

where, n is a natural number,
θ is an angle that is formed between-the first direction and the second direction,
l is a length in the predetermined direction of each of the first slit and the second slit, and
L is an interval in the intersection direction between the first and second slits adjacent to each other in the intersection direction.

2. The fiber-reinforced sheet laminate according to claim 1, wherein the first direction and the second direction are directions along a direction in which a compressive force or a tensile force acts on the first fiber-reinforced sheet and the second fiber-reinforced sheet when bending is performed on the first fiber-reinforced sheet and the second fiber-reinforced sheet.

3. A production method for a fiber-reinforced sheet laminate, the method comprising:
a lamination step of laminating a first fiber-reinforced sheet having first fibers extending in a first direction and a second fiber-reinforced sheet having second fibers extending in a second direction different from the first direction; and a slitting step of forming a plurality of slits in the laminated first fiber-reinforced sheet and second fiber-reinforced sheet to cut the first fibers and the second fibers, wherein in the slitting step, the slits are formed to cut the first fibers such that the cut first fibers have a same first length and cut the second fibers such that the cut second fibers have a same second length, wherein the slits extend in a predetermined direction, and in the slitting step, the plurality of slits are formed over multiple rows in the predetermined direction, the slits that are formed in a first row in the predetermined direction are disposed to be spaced apart from each other in an intersection direction that is a direction intersecting the predetermined direction, each of the slits that are formed in a second row in the predetermined direction is disposed at a midpoint in the intersection direction between the slits formed in the first row adjacent to the second row, one end in the predetermined direction of the slit in the first row and the other end in the predetermined direction of the slit in the second row are at the same position in the predetermined direction, and the plurality of slits are formed such that disposition of the plurality of slits is defined by the following expression (2),

[Expression 2]

$$l = \frac{L \times \tan\theta}{4n} \quad (2)$$

where n is a natural number,

θ is an angle that is formed between the first direction and the second direction, l is a length in the predetermined direction of the slit, and L is an interval in the intersection direction between the slits adjacent to each other in the intersection direction.

4. A production method for a structure in which a structure is manufactured from the fiber-reinforced sheet laminate manufactured by the production method for a fiber-reinforced sheet laminate according to claim 3, the method comprising:

a bending step of performing bending on the first fiber-reinforced sheet and the second fiber-reinforced sheet such that a compressive force or a tensile force acts in the first direction and the second direction.

* * * * *